US007124151B1

United States Patent
Choi

(10) Patent No.: US 7,124,151 B1
(45) Date of Patent: Oct. 17, 2006

(54) DATABASE SYNCHRONIZATION APPARATUS IN ELEMENT MANAGEMENT SYSTEM AND METHOD THEREFOR

(75) Inventor: Joong-Kyu Choi, Seoul (KR)

(73) Assignee: LG-Nortel Co., Ltd., Seoul (KR)

( * ) Notice: Subject to any disclaimer, the term of this patent is extended or adjusted under 35 U.S.C. 154(b) by 0 days.

(21) Appl. No.: 09/469,307

(22) Filed: Dec. 22, 1999

(30) Foreign Application Priority Data

Dec. 26, 1998 (KR) .................................... 98-58802

(51) Int. Cl.
*G06F 12/00* (2006.01)
(52) U.S. Cl. ...................................... 707/200; 707/205
(58) Field of Classification Search ................ 707/201, 707/200, 100, 101, 102, 103 R, 104.1; 709/201
See application file for complete search history.

(56) References Cited

U.S. PATENT DOCUMENTS

| | | | | |
|---|---|---|---|---|
| 4,903,321 A * | 2/1990 | Hall et al. | ................. | 455/515 |
| 5,151,896 A * | 9/1992 | Bowman et al. | ............. | 370/401 |
| 5,596,574 A * | 1/1997 | Perlman et al. | ............. | 370/389 |
| 5,761,647 A * | 6/1998 | Boushy | ........................ | 705/10 |
| 5,799,141 A * | 8/1998 | Galipeau et al. | ............... | 714/13 |
| 5,805,798 A * | 9/1998 | Kearns et al. | ................. | 714/48 |
| 5,850,522 A * | 12/1998 | Wlaschin | .................... | 709/215 |
| 5,890,156 A * | 3/1999 | Rekieta et al. | ................. | 707/10 |
| 5,892,946 A * | 4/1999 | Woster et al. | ................ | 719/316 |
| 5,924,094 A * | 7/1999 | Sutter | ........................... | 707/10 |
| 5,941,951 A * | 8/1999 | Day et al. | .................... | 709/233 |
| 5,951,638 A * | 9/1999 | Hoss et al. | ................... | 709/206 |
| 5,978,813 A * | 11/1999 | Foltz et al. | ................... | 707/201 |
| 5,999,947 A * | 12/1999 | Zollinger et al. | ........... | 707/203 |
| 6,035,412 A * | 3/2000 | Tamer et al. | ................... | 714/6 |
| 6,108,409 A * | 8/2000 | Cooper et al. | .............. | 379/230 |
| 6,904,110 B1* | 6/2005 | Trans et al. | ................. | 375/350 |
| 2003/0016770 A1* | 1/2003 | Trans et al. | ................. | 375/346 |
| 2003/0086515 A1* | 5/2003 | Trans et al. | ................. | 375/346 |
| 2005/0186933 A1* | 8/2005 | Trans | ......................... | 455/296 |

\* cited by examiner

*Primary Examiner*—Frantz Coby
(74) *Attorney, Agent, or Firm*—Fleshner & Kim, LLP

(57) ABSTRACT

The present disclosure relates to a database (DB) synchronization apparatus of a transmission network system which includes a plurality of network elements (NEs) and an Element Management System (EMS). Each of the NEs may include a common memory in which DB information and alarm state information are rearranged and a sync-related memory of the same pattern as the common memory for maintaining DB identity with the EMS. The EMS may include a EMS sync-related memory for storing the DB and the information of the sync-related memory of the plurality of NEs, and a EMS common memory corresponding to the common memory (CM) of the NE. A common memory which reflects database information and the current alarm information to the NEs, and a sync-related memory which stores data prior to a T-second period are built on the NEs, and these two memories are compared in block units to thereafter transmit only modified block data to the EMS. Accordingly, there is the advantage that since synchronization is established by the comparison of the memories, an initialization execution time is very fast, and a real-time data monitoring and management is convenient.

22 Claims, 5 Drawing Sheets

< THE TRANSMISSION BLOCK ACCORDING
  TO THE PRESENT INVENTION >

DATABASE SYNCHRONIZATION APPARATUS IN ELEMENT MANAGEMENT SYSTEM AND METHOD THEREFOR

BACKGROUND OF THE INVENTION

1. Field of the Invention

The present invention relates to an EMS(Element Management System) and, in particular, to a method for a database synchronization between an EMS and NEs(Network Elements).

2. Description of the Prior Art

Generally, in a transmission network system, since a network element management system processes real-time data, a status of a network element (hereinafter referred to as NE) must be analyzed accurately and rapidly for thereby reporting to the network element management system.

FIG. 1 is a view illustrating a network EMS(hereinafter referred to as EMS) and network elements in the conventional art.

As shown in FIG. 1, each of the NEs has its NE_DataBase (hereinafter referred to as NE_DB). In the case that a data such as a DB, DB information, alarm state information, etc. is modified, the NE reports its changed status to the EMS, and the EMS performs a network management using a newly reported data.

As described above, the process in which each of the NEs reports its DB, DB information, alarm state information, etc. to the EMS, and, as a result, each NE and the EMS have the same information, is referred to as an identity maintaining process. The process in which the modified data is detected by the EMS at a certain time (period) $T_1$ and thereby a network management is performed using a modified database$_1$ is referred to as a synchronization.

There are two methods of maintaining the identity of the DB. One is a method in which the EMS periodically demands a synchronization from the NEs. The other is a method in which the NEs automatically report their modifications when the NEs are modified.

However, the former method has a disadvantage that since the EMS demands that each NE reports its modified DB by item and by pattern, the initialization process for synchronization between the EMS and each NE is lengthened. Accordingly, there arises a problem that it is difficult to apply the modified DB generated between the EMS and the NEs to the EMS accurately and rapidly.

In addition, the latter method is a method in which each NE reports its modifications to the EMS whenever its DB is modified. There is a possibility of a trade-off between a reporting period(T) and sync-related data. Therefore, when the reporting period is shortened, the amount of traffic is increased. On the contrary, when the reporting period is lengthened, the amount of sync-related data is increased, making it difficult to apply a real-time data.

SUMMARY OF THE INVENTION

Accordingly, it is an object of the present invention to provide a method for synchronization between an EMS and a NE which facilitates a real-time DB monitoring and management by transmitting the status information of a modified NE.

To achieve the above object, the present invention, in a DB synchronization apparatus of a transmission network system which includes a plurality of NEs and a EMS, Ech of the NEs includes a common memory in which DB information and alarm state information are provided and a sync-related memory of the same pattern as the common memory for maintaining DB identity with the EMS. The EMS includes a EMS sync-related memory for storing the DB and information of the synch-related memories of the plurality of NEs, and a EMS common memory corresponding to the common memory of the NE.

In addition, in a method for DB synchronization in a transmission network which includes a plurality of NEs and a EMS, the NE compares the current status memory (common memory) with the previous status memory (related memory) in block units, and transmits the position and information of a modified block to the EMS and copies the same for thereby applying DB synchronization periodically.

Additional advantages, objects and features of the invention will become more apparent from the description which follows.

BRIEF DESCRIPTION OF THE INVENTION

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of the present invention will now be described with reference to the accompanying drawings.

Figure 1:
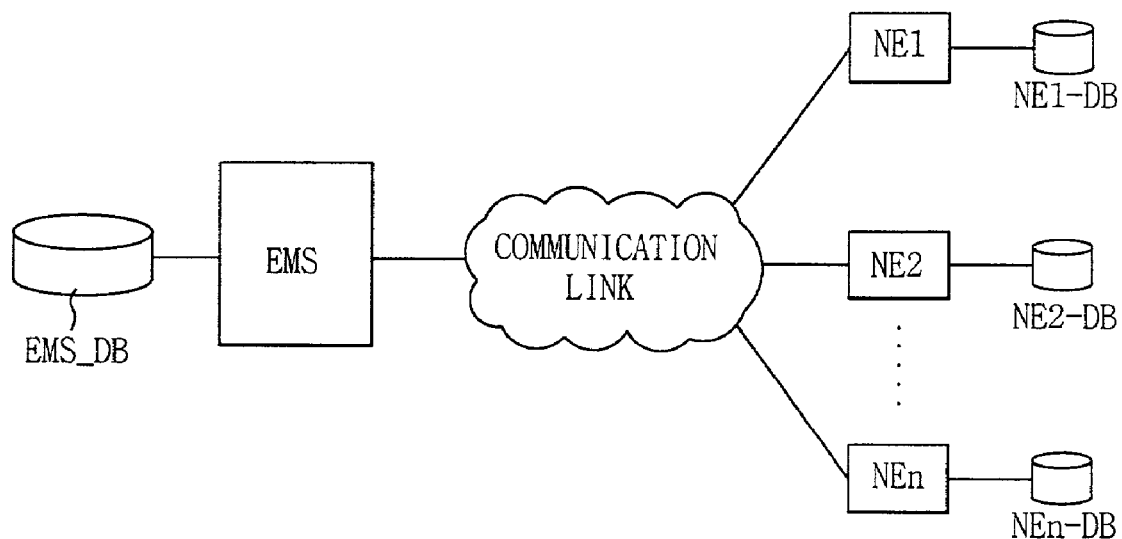
FIG. 1 is a block diagram of a communication network of a EMS and NEs in a general transmission network.
Figure 2:
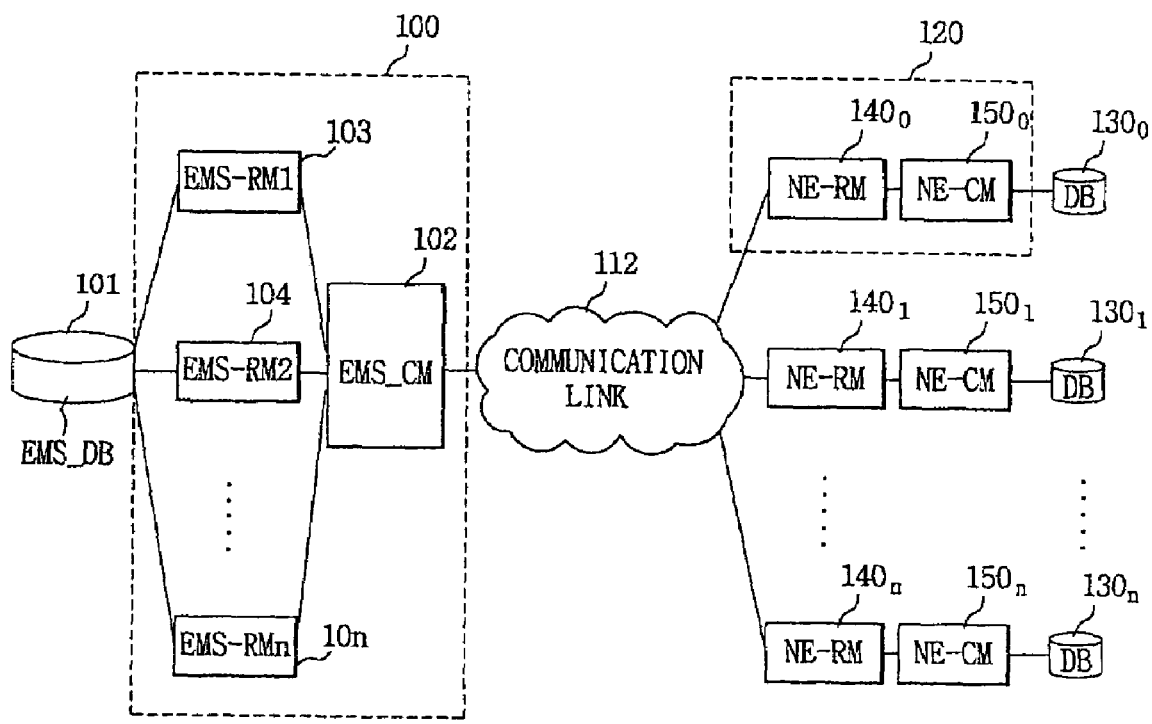
FIG. 2 is a block diagram of a communication network of a WDCS_EMS and WDCS_NEs according to the present invention.

FIG. 2 is a block diagram of a communication network of a WDCS_EMS and WDCS_NEs according to the present invention and, in particular, a block diagram of a communication network of a EMS and NEs in a transmission network of a plurality of wide distribution control system network elements (hereinafter referred to as NE) $120 \sim 12n$ and a wide distribution control system element management system (hereinafter referred to as EMS) $100$ which operates and manages NEs. A EMS and a N number of NEs are connected through a communication link $112$ of the same pattern as a packet network.

Each of the NEs is comprised of the same DB $130_0$–$130_n$ as the conventional methods, a common memory (hereinafter referred to as NE_CM) $150_0$–$150_n$ in which DB information and alarm state information are rearranged, and a sync-related memory (hereinafter referred to as NE_RM) $140_0$–$140_n$ which is a memory of the same pattern as the NE_CM $150_0$–$150_n$ for maintaining DB identity with the EMS.

In addition, the EMS 100 is comprised of a EMS_RM 103 which stores the same DB as the conventional methods, the RM 140 information of each NE, and a EMS_CM 102 corresponding to the CM of the NEs.

Figure 3:
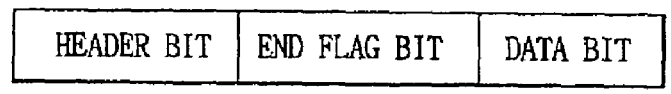
FIG. 3 illustrates a data pattern for a data synchronization in the present invention.

FIG. 3 illustrates a data format according to the present invention. After comparing a NE_CM $150_0$–$150_n$ and a corresponding NE_RM $140_0$–$140_n$ in block unit, a series of data can be divided into a header bit, an EndFlag bit and a data bit. The header bit stores the sequence (i) of the corresponding block if NE_CM data and NE_RM data are not identical. The EndFlag bit is a 1 if a transmitted data is the last block, or is a 0 if a transmitted data is not the last block. The data bit contains real transmitted data.

The embodiment of FIG. 2 can be described as follows in more detail with reference to FIG. 3. As a result of the comparison between the NE_CM and the NE_RM in block unit, if it is found that there is a block changed, the number (i) of the corresponding block is written on the header of data which will be transmitted for thereby transmitting the same to the RM of the EMS, and NE_CM data is copied into the NE_RM to thus store the current status of the NEs in the NE_RM.

By the above procedure, when the EMS succeeds in receiving a modified data from each NE, the received data is stored in the RM of the EMS in accordance with the corresponding header. When the EMS fails to receive the modified data, the next modified data is received after increasing the cell block counter, and the modified data that has failed to be received is received in the next period. In this manner, the RM of the EMS is copied into the CM of the EMS for thereby reflecting the current status immediately.

Moreover, when a network operation manager selects a certain NE in the EMS, the EMS_RM is copied into the EMS_CM, so that the status of the corresponding NE is monitored immediately.

As described above, according to the present invention, changes of the NEs can be rapidly found by comparing the sync-related memory and the common memory. The more the amount of database change is, the smaller amount of data blocks are transmitted, thereby obtaining a database synchronization. Therefore, database changes are applicable to the EMS within a short time, and a real-time data monitoring and management becomes easier.

The operational procedure according to the present invention can be divide into a first step of initialization, a second step of periodical reporting, a third step of resynchronization, and a fourth step of manual synchronization.

The first step of initialization will be described below with reference to FIG. 4.

First, when the system of the NEs is driven in step S301, the NE_CM is configured according to the DB information and the current alarm state, and, at the same time, the NE_RM waits a synchronization request signal (SYNC_REQ) or a resynchronization request signal (RESYNC_REQ) from the EMS after the initialization in step S302.

Meanwhile, when the EMS system is driven, a SYNC_REQ signal is transmitted to all of the NEs in step S303. Each NE that has received this signal sends a synchronization acknowledgement (SYNC_ACK) to the EMS in step S304. The EMS prepares a sync-related data for storing the same to the EMS_RM after receiving the SYNC_ACK.

The NE which has received the SYNC_ACK compares the NE_RM and the NE_CM in data block unit in step S305. If both data are not identical, the position and data of the corresponding block is transmitted in the data format of FIG. 3 in step S307. If the transmission succeeds in step S308, the corresponding block (i) of the NE_CM is copied into the corresponding block (i) of the NE_RM in step S309. Steps S301 through S309 of the flow chart are executed on all of the NEs. The above procedure is performed in block unit in step S311. When the data transmission of the last block in step S310 succeeds, the database synchronization between the EMS and the NEs is finished in step S400, and thereafter the periodical reporting step is performed.

Figure 5:
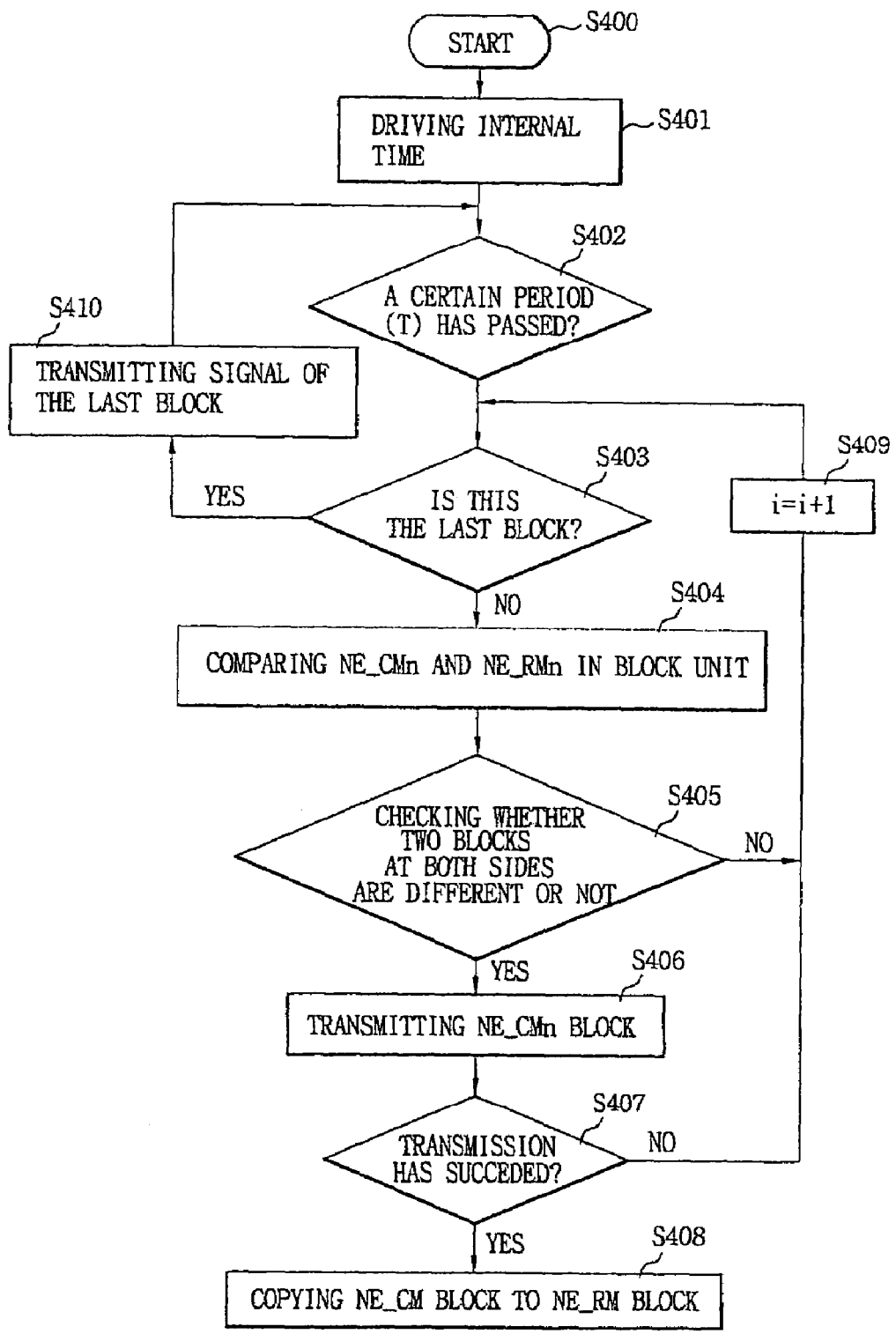
FIG. 5 is a flow chart illustrating a periodical reporting process according to the present invention.

The second step of periodical reporting, as illustrated in FIG. 5, will be described as follows.

Figure 4:
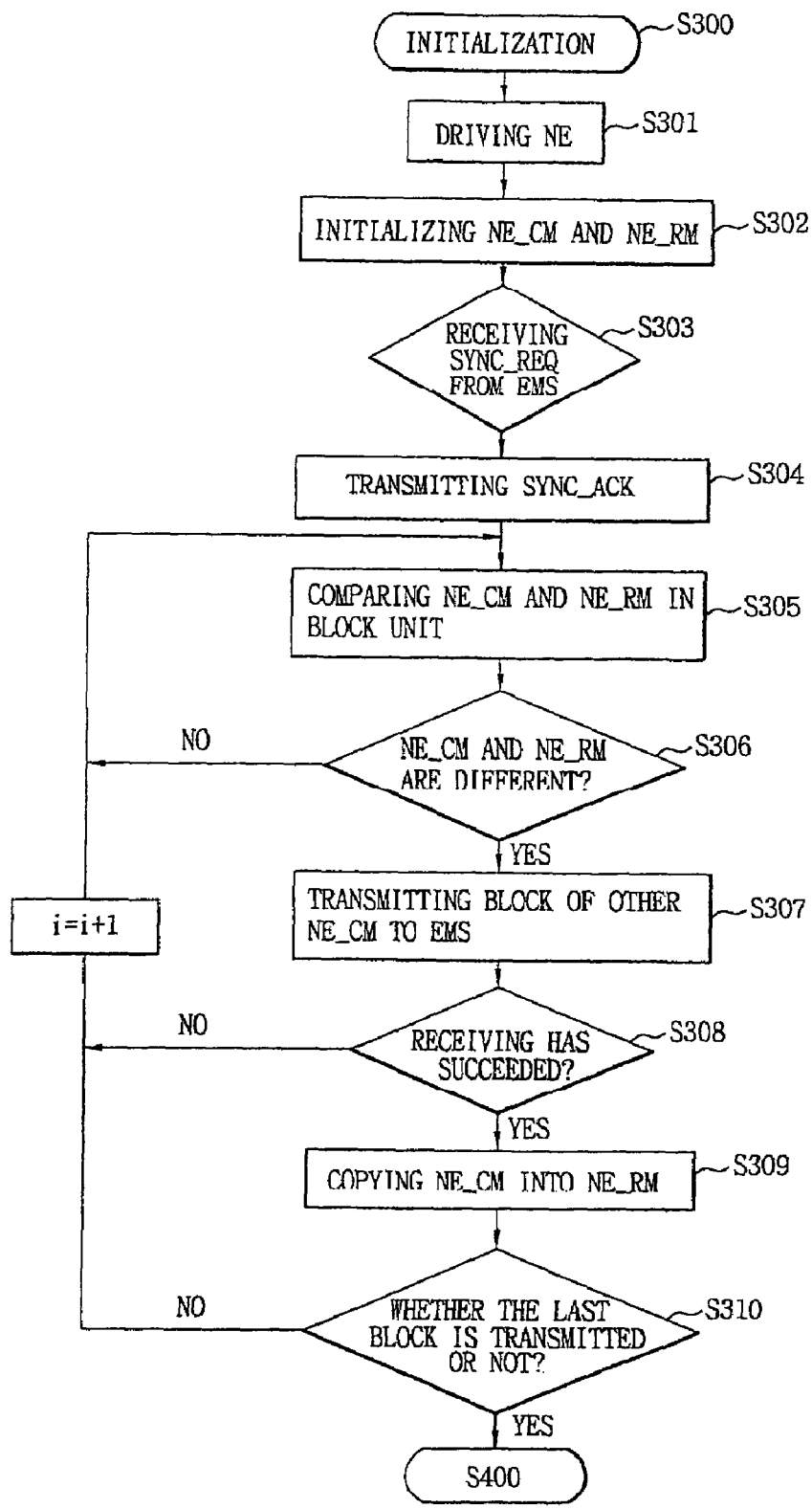
FIG. 4 is a flow chart illustrating a method for a synchronization between a EMS and NEs according to the present invention.

Once the initialization is finished as illustrated in FIG. 4, both data in the RM of the EMS and the RM of the NE, respectively, become identical. Subsequently, when an internal timer is driven in step S401 for a periodical reporting to thereafter start a T-second period in step S402, the NE_CM and NE_RM of the NE are compared each other in block unit in steps S404 and S405.

As a result of the comparison, in the case that two blocks at both sides are different, that is, data is changed, the position and data of the corresponding block is transmitted to the EMS in step S406. If the transmission succeeds in step S407, the corresponding block of the NE_CM is copied into the corresponding block of the NE_RM in step S408. At the same time, the EMS receives the corresponding data for thereby copying the same into the EMS_RM. The above comparison based on the block unit continues to the last block in step S403, and the procedure for one period T is ended after transmitting the last block.

If there is no modified data during a certain period T, the last block of the NE_RM is transmitted to the EMS in step S409, and the EMS finishes the procedure for one period after receiving the last block of the NE_RM.

Figure 6:
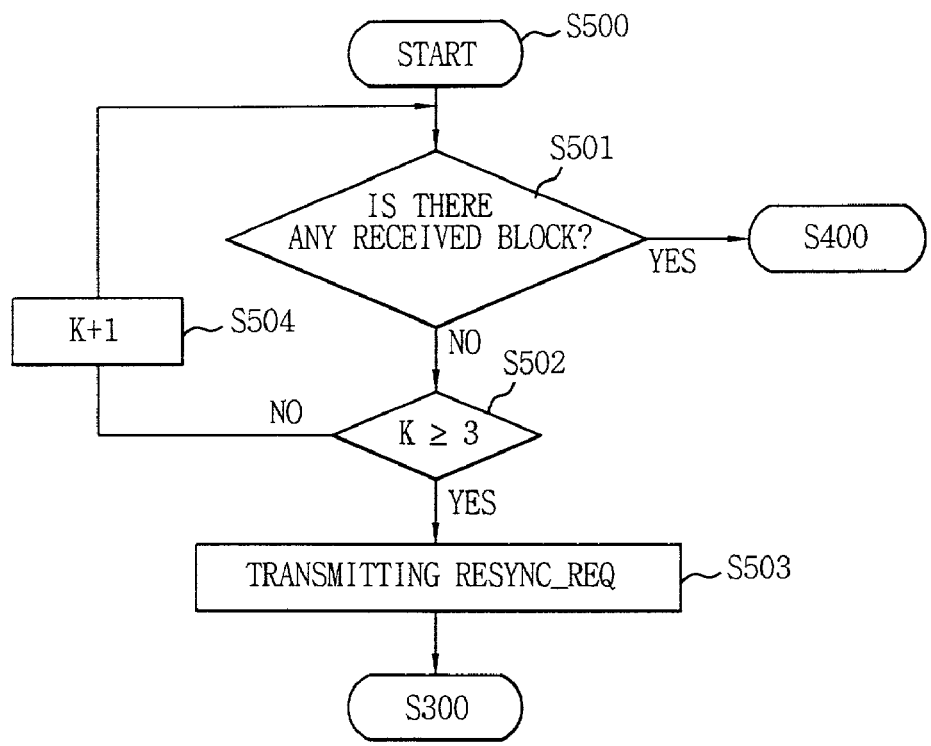
FIG. 6 is a flow chart illustrating a resynchronization process according to the present invention.

The third step of resynchronization, as illustrated in FIG. 6, will be described as follows.

In the case that the NE transmits a sync-related data to the EMS at T-second periods, the NE must transmit the last block of the NE_RM even though there is no change for T-seconds.

That is, the EMS has to receive a sync-related data more than once from an arbitrary NE within a T-second period. However, if the NE system is down, or there occurs a error in a link path, the EMS is unable to receive a sync-related data from the NEs within a T-second period.

As illustrated in FIG. 6, if the EMS has failed to receive any sync-related data within a T-second period more than three times, a resynchronization request (RESYNC_REQ) signal is transmitted to the NEs in step S503, when a sync-related data is received as a result of the resynchronization request, the routine returns to step S402 of FIG. 5.

For instance, in the case that the NE system is down, and then up, an acknowledgement to the RESYNC_REQ is transmitted to the EMS to thereafter execute the initialization step, as illustrated in FIG. 4, again.

In addition, in the case that a link error occurs and then, is recovered, if a RESYNC_REQ is received from the EMS to the NEs, an acknowledgement to the RESYNC_REQ is transmitted to the EMS, then both data in the NE_CM and NE_RM are compared, and then data which is modified during the error is transmitted to the EMS.

The resynchronization step is performed aperiodically (aperiodically eight times for 30 minutes) for a certain time after the error occurrence. In the case that the error is not recovered even after the above resynchronization step, the routine passes to the manual synchronization step.

The manual synchronization step is executed because it is more effective that a network operation manager performs synchronization manually in order to prevent overload on the system and links, in the case that the error is not recovered even after the resynchronization step. The manual synchronization step will be described below.

In the case that a link error between the EMS and the NEs continues for a certain time (more than 30 minutes), the automatic resynchronization step is stopped to thereafter pass to the manual synchronization step in which an operator performs synchronization manually.

The network operator determines whether the corresponding NE or link error is recovered, and manually performs a synchronization instruction on the menu. In the case that the error is not recovered, the error state does not change. When the manual synchronization succeeds, the NEs transmit a sync-related data to the EMS to thereafter switch back to the periodical reporting state.

Figure 7:
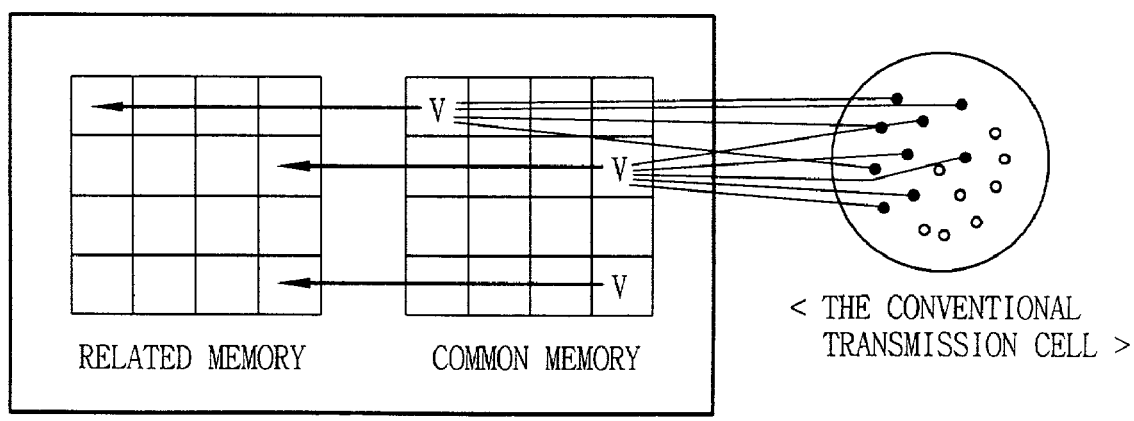
FIG. 7 is a view illustrating a comparison between a transmission block according to the present invention and a conventional transmission cell.

As described above, the present invention provides the NEs with the NE_CM which contains DB information as well as the current alarm state, and the NE_RM which stores data prior to a T-second period. Thereafter, both memories are compared for thereby transferring data to the network element management system rapidly and accurately. In addition, as illustrated in FIG. 7, in the case that changes in databases in both memories are concentrated in a certain particular block, a small amount of data blocks are transmitted to thus establish an effective database synchronization. Accordingly, there is the advantages that a real-time data monitoring and management is possible, initialization time is fast, and an effective database synchronization can be established.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. An apparatus for database synchronization in a network comprising:
   at least one or more network elements which compare block units of information in a common memory storing current status information and information in a sync-related memory storing previous status information, the at least one or more network elements transmitting data results of the comparison; and
   a network element management system which stores the data results of the comparison transmitted from the network elements for thereby monitoring and managing the network elements in real time.

2. The apparatus of claim 1, wherein, in said at least one or more network elements, said common memory and said sync-related memory are connected to each other for thereby periodically comparing information within both memories.

3. The apparatus of claim 1, wherein each of said at least one or more network elements includes a separate database.

4. The apparatus of claim 1, wherein said network element management system has a sync-related memory for storing changes in memory based on the comparison between the common memory and the sync-related memory of said at least one or more network elements.

5. The apparatus of claim 4, wherein said network element management system has a common memory which is connected with said sync-related memory of the network element management system to thereby store current network status information transmitted as the data results.

6. The apparatus of claim 4, wherein said network element management system includes a database separate from the sync-related memory and the common memory of the network element management system.

7. In a network which is provided with at least one or more network elements, a method for database synchronization in the network comprising the steps of:
   comparing block units of information in a common memory which reflects database information of said network elements with block units of information in a sync-related memory which stores data prior to a certain period;
   transmitting only modified block data, as a result of said comparison, to said network element management system; and
   storing said transmitted data in the memory of the network element management system.

8. The method of claim 7, wherein said step of comparing the information in the two memories in block units includes an initialization step in which initial values of the memories are set according to database information and alarm information, and waiting for a synchronization request.

9. The method of claim 8, wherein said initialization step includes:
   a step in which at least one or more network elements initialize a common memory according to their database information and alarm information;
   a step of initializing said common memory and the sync-related memory at a same time; and
   a step of waiting for a SYNC_REQ signal from said network element management system.

10. The method of claim 8, wherein said step of transmitting said modified data to said network element management system includes:
    a step of transmitting a position and data of a corresponding block when data in said common memory and data in said sync-related memory are not identical;
    a step of copying the corresponding block of the common memory into the corresponding block of the sync-related memory; and
    a step of comparing a next block again when said both data are identical.

11. The method of claim 10, wherein said step of transmitting said modified data to said network element management system further includes a step of not copying the corresponding block of the common memory into the corresponding block of the sync-related memory, in the case that a transmission of the modified data to the network element management system has failed.

12. The method of claim 7, wherein said step of comparing block units of said two memories further includes:
    a step of transmitting a last block of said network elements to said network element management system, in the case that there is no change in blocks.

13. The method of claim 7, wherein said step of comparing block units of said common memory and the sync-related memory includes:
    a resynchronization step of setting initial values of the memories according to said database information and said alarm information, and synchronizing said values, in the case that said network element management system continues not receiving signals from said network elements more than a certain number of times for a certain period (T).

14. The method of claim 13, wherein said resynchronization step includes:
    a step of passing to a manual synchronization step in order not to impose a load on the corresponding link, in the case that the resynchronization step is proceeded for a certain time, but synchronization is not established.

15. The method of claim 13, wherein said resynchronization step includes:
- a step of waiting for a resynchronization signal from said network element management system, in the case that a link error is recovered;
- a step of comparing both data in said common memory and said sync-related memory when said resynchronization signal is received; and
- a step of transmitting changes occurred during said link error to the network element management.

16. The method of claim 14, wherein said manual synchronization step includes:
- a step of transmitting sync-related data to said network element management system, when a link error recovery is confirmed by a network operator.
- a step of passing to said periodical reporting step; and
- a step of maintaining a current manual state, when said link error recovery is not confirmed.

17. The apparatus of claim 1, wherein the network element management system stores the data results so as to synchronize data between the network element management system and the at least one or more network elements.

18. The method of claim 7, wherein the network element management system stores the data so as to synchronize data between the network element management system and the at least one or more network elements.

19. A data synchronization method comprising:
- comparing blocks of information in a common memory of a network element with blocks of information in a sync-related memory of the network element;
- transmitting data from the network element to a management system based on the comparison; and
- storing the transmitted information in the management system.

20. The method of claim 19, wherein transmitting the data involves transmitted modified information of the blocks of data.

21. The method of claim 19, further comprising providing initial values to the common memory and the sync-related memory.

22. The method of claim 19, wherein transmitting the data includes transmitting a position and data block of information stored in the management system.

* * * * *